March 31, 1953  D. BADAMI  2,633,147
SAFETY SHUTOFF VALVE FOR AIR BRAKE SYSTEMS
Filed Jan. 8, 1952
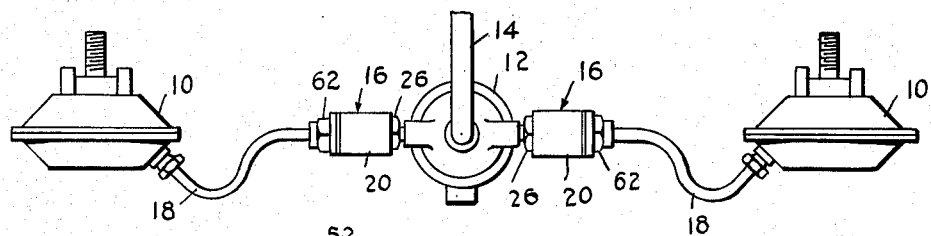
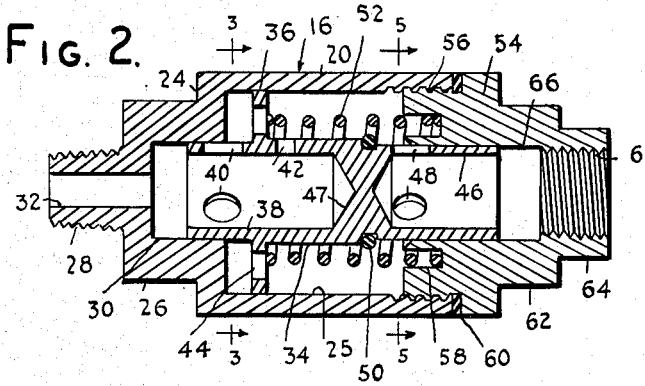
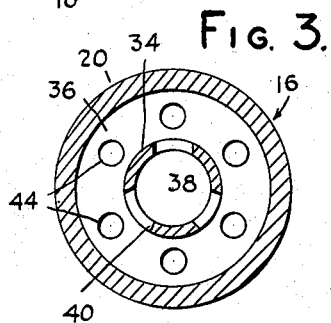
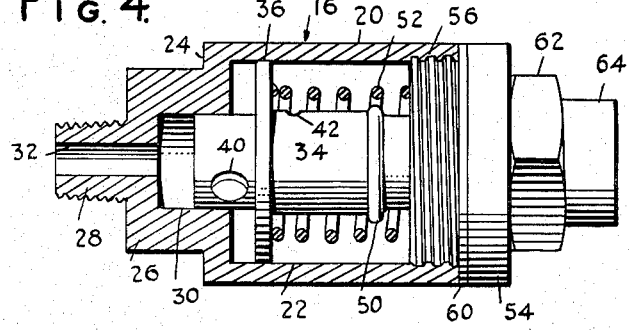
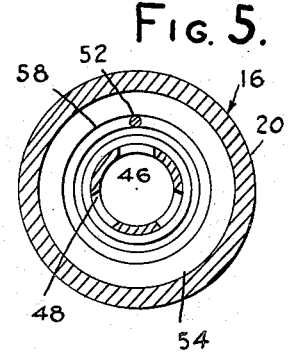
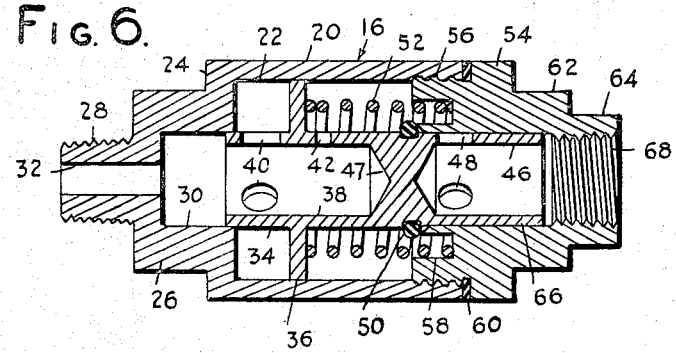
INVENTOR
DOMINIC BADAMI
BY
McMorrow, Berman & Davidson
ATTORNEY Patented Mar. 31, 1953

2,633,147

UNITED STATES PATENT OFFICE 2,633,147

SAFETY SHUTOFF VALVE FOR AIR BRAKE SYSTEMS

Dominic Badami, Grant City, N. Y.

Application January 8, 1952, Serial No. 265,393

4 Claims. (Cl. 137—506)

1

This invention relates to automatically actuated shut-off valves, and more particularly has reference to a valve of the type stated especially well adapted for incorporation in the air brake system of a truck or similar vehicle.

During the normal operation of an air brake system of the type stated, air is forced under a predetermined pressure to the vehicle brakes for the purpose of operating said brakes in the desired manner. Subsequently, when the air pressure is released, the air returns through the system and is exhausted to atmosphere.

When, however, a trouble condition develops, it becomes desirable to provide for the automatic shutting off of the flow of air to the brake in which the condition develops, so as to prevent all of the brakes from being rendered ineffective.

The main object of the present invention is to provide a generally improved, automatically actuated shut-off valve which will be operated whenever abnormal conditions arise within the system, thus to shut off the flow of air through an affected part of the system.

Another important object is to provide a valve of the type stated which can be incorporated within the conventional air brake system used upon a truck or similar vehicle, without the necessity of extensive modification or redesigning of the system.

Yet another important object is to provide an automatically operated valve, as described, which is so formed as to permit the normal operation of the system, without danger of the valve being operated except when the abnormal conditions referred to above arise, the valve formed in accordance with the present invention being so designed as to permit the normal flow of air in both directions therethrough at all times when the brake system is in a trouble-free condition.

A still further important object is to provide a shut-off valve, as stated, which can be manufactured at relatively low cost, will be efficient in use, and will be of rugged construction.

Other objects will appear from the following description, the claims appended thereto, and from the annexed drawings, in which like reference characters designate like parts throughout the several views, and wherein:

Figure 1 is a diagrammatical view illustrating a pair of shut-off valves formed in accordance with the present invention, as they appear when incorporated in a conventional air brake system of a truck;

Figure 2 is an enlarged longitudinal sectional view through one of the shut-off valves, the parts being illustrated in the position assumed thereby when the brake system is in normal operation;

Figure 3 is a transverse sectional view taken on line 3—3 of Figure 2;

Figure 4 is a view of the valve, partly in longitudinal section and partly in side elevation;

Figure 5 is a transverse sectional view taken on line 5—5 of Figure 2; and

Figure 6 is a view similar to Figure 2, the parts being positioned to shut off the flow of air through the valve.

Referring to the drawings in detail, in Figure 1 I have illustrated, somewhat diagrammatically, part of an air brake system of a truck, the front end of the system being illustrated. In this figure there is shown a pair of conventionally formed brake diaphragms 10, between which is interposed the usual quick release valve 12. A line 14 extends to the quick release valve. At 16 I have designated generally shut-off valves formed in accordance with the present invention, said valves being respectively connected at one end to the quick release valve and at their other ends to flexible air lines 18 leading to the brake diaphragms.

Each of the valves 16 is identical to the other, and accordingly, one only shall be described. In this connection, the valve is formed with a tubular, large-diameter body 20 formed with an air chamber 22. One end of the body is integral with an end wall 24, and formed upon the outer surface of the end wall is a non-circular shoulder 26 adapted to receive a wrench or similar tool. The shoulder 26 is formed integrally with an axial extension 28 having external threads for connection of one end of the valve to a suitable hose fitting or the like. Thus, the extension 28 can be connected to the quick release valve 12 in close proximity thereto, so as to provide communication between said quick release valve and the shut-off valve constituting the present invention.

Formed in the end wall 24 and shoulder 26 is a counterbore 30 communicating at one end with the chamber 22, and communicating at its other end with a passage 32, whereby air forced into the shut-off valve from the quick release valve will be fed under pressure to the interior of the body 20.

Mounted within the body 20 and aligned coaxially therewith is a control cylinder 34, which is mounted for axial sliding movement within the body between one extreme position illustrated in Figure 2 and another extreme position illustrated in Figure 6. The control cylinder is formed, intermediate opposite ends thereof, with a circumferential guide collar 36 which slidably contacts the inner wall of the chamber 22 of the valve body.

Further guiding the movement of the control cylinder within the body 20 is the wall of the counterbore 30 in which the adjacent end of the control cylinder is slidably mounted.

In said end of the control cylinder I form an elongated, axially extending recess 38, said recess extending slightly beyond the mid-length location of the control cylinder. The recess 38 is in communication at its outer end with the counterbore 30, and adjacent said outer end of the recess a series of circumferentially spaced ports 40 is provided in the wall of the control cylinder. The ports 40 communicate between the recess 38 and the chamber 22, so that air forced under pressure through the bore 32 and counterbore 30 will be forced into the recess 38 and will then be directed outwardly through the ports 40 into the chamber 22 of the valve body.

Between the ports 40 and the inner end of the recess 38 an aperture 42 is provided, which also communicates between the recess and chamber. However, the aperture 42 is so located as to be between the guide collar 36 and the inner end of the recess, while the ports 40 are disposed between the guide collar and the outer end of the recess.

Formed in the guide collar 36 is an annular series of openings 44, said opening being adapted to permit passage of air past the guide collar, after said air is forced through the ports 40 into the chamber 22.

In the other end of the control cylinder I form a second axial recess 46, said recess terminating at its inner end against a partition 47 formed in the cylinder. The partition 47 closes off direct communication between the recesses 38, 46, so that air forced out of the recess 38 must pass through the chamber 22, and then into the recess 46 through a series of openings 48.

Formed in the outer surface of the control cylinder is an annular groove in which is seated a neoprene washer 50, said washer being disposed between the openings 48 and the aperture 42.

A spring 52 surrounds the control cylinder, and urges said cylinder normally to the left in Figure 2, the spring abutting at one end against the guide collar 36 and at its other end against a cylinder retainer 54. The cylinder retainer 54, in order to hold the spring 52 in proper position, is provided on its inner face with an annular seat 58 receiving the spring.

Formed upon the outer surface of the retainer 54 are threads 56, said threads being complementary to internal threads formed in the wall of the body 20, thus to permit the retainer to be removably connected to the valve body. A gasket 60 is interposed between the retainer and the adjacent end of the valve body to prevent leakage through the threadable connection.

On the outer end of the retainer 54 I form a non-circular shoulder 62 adapted to receive a wrench or like tool, said shoulder being integral with an axial extension 64.

The retainer 54 is provided with an axial bore 66 receiving the adjacent end of the control cylinder, so that the control cylinder may have axial sliding movement in the inner end of the retainer.

The outer end of the bore 66 is internally threaded, as at 68, for connection of the retainer to a suitable fitting, whereby the bore 66 may be brought into communication with the flexible air line 18 of the air brake system.

In use of the device, the spring 52 will normally urge the guide collar 36 against the end wall 24 of the valve body. In this position of the parts, the ports 40 are closed, while the openings 48 will be in communication with the recess 46 and chamber 22.

During normal operation of the air brake system, air will be directed under pressure through the bore 32 and into the recess 38. This pressure will be sufficient to shift the control cylinder to the right in Figure 2, so as to partially expose the openings or ports 40, while partially closing the openings 48.

As a result, the air forced under pressure into the recess 38 will be directed through the openings 40, and will then pass through the openings 44 of the guide collar. Thereafter, the air will be directed through the chamber 22, and will pass through the ports 48 into the recess 46.

The air will thus pass to the diaphragms 10 for effecting normal operation of the vehicle brakes.

Continuing with the discussion of the normal operation of the system, release of the air pressure is effective to cause a return of the air from the diaphragm to the recess 46. The spring 52, at this time, will be allowed to exert its full action, so as to force the guide collar 36 against the end wall 24, and thus the air will pass outwardly from the recess 46 through the openings 48, and after passing through the chamber 22, will be exhausted through the exhaust port or aperture 42.

Should an abnormal condition develop wherein an excessive amount of pressure occurs, the air forced under pressure into the recess 38 will cause movement of the control cylinder to the right in Figure 2 to such an extent as to cause the neoprene washer 50 to seat against the adjacent surface of the retainer 54, thereby to close off communication completely between the chamber 22 and recess 46. As a result, the valve is effective to shut off the flow of air therethrough, and in this way isolates the troubled condition.

It will be understood that although the valve has been illustrated in Figure 1 adjacent the quick release valve, it would be placed between the rear air line hoses and the relay valve when used at the rear end of the air brake system.

Further, it is believed important to note that although the valve has been illustrated in association with an air brake system for vehicles, it might be used with equal effectiveness in other air systems for the purpose of automatically shutting off the flow of air when abnormal conditions develop.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A safety shut-off valve for air systems comprising: a valve body hollowly formed to provide an air chamber therein and having, at one end, an end wall provided with a bore communicating with the chamber; a retainer formed as a plug closing the other end of the body and having a bore coaxial with the end wall bore; a reciprocable cylinder extending through the chamber and having its opposite ends slidably mounted in the respective bores, the cylinder having first and second recesses in its respective ends, a first series of openings communicating between the first recess and the chamber, a second series of openings communicating between the second recess and chamber, and an exhaust port disposed between the respective series and communicating between the first recess and the chamber; and a spring normally urging the cylinder in the direction of the end wall, said cylinder being arranged for adjustment to predetermined, flow-controlling positions within the body, namely, a middle position in which both series of openings are in communication with the chamber to permit air flow through both of said series toward the retainer, said position being obtained by exertion of a predetermined air pressure against the cylinder in the direction of the retainer, effective to balance the force of the spring; a first extreme position in which the first series of openings is closed by the wall of the end wall bore and air flow is toward the end wall through the second series of openings and exhaust port, said first extreme position being obtained by exertion of back air pressure in the direction of the end wall, and a second extreme position in which the second series of openings is closed by the wall of the retainer bore, said last-named position being obtained on exertion of air pressure in the direction of the retainer to an extent sufficient to overbalance the opposing force of the spring.

2. A safety shut-off valve for air systems comprising: a valve body hollowly formed to provide an air chamber therein and having, at one end, an end wall provided with a bore communicating with the chamber; a retainer formed as a plug closing the other end of the body and having a bore coaxial with the end wall bore; a reciprocable cylinder extending through the chamber and having its opposite ends slidably mounted in the respective bores, the cylinder having first and second recesses in its respective ends, a first series of openings communicating between the first recess and the chamber, a second series of openings communicating between the second recess and chamber, and an exhaust port disposed between the respective series and communicating between the first recess and chamber; an apertured guide collar formed on the cylinder and slidably engaging the wall of the chamber at its periphery; and a spring surrounding the cylinder and held under compression between the guide collar and retainer, said spring normally urging the cylinder in the direction of the end wall, the cylinder being arranged for adjustment to predetermined, flow-controlling positions within the body, namely, a middle position in which both series of openings are in communication with the chamber to permit air flow through both of said series toward the retainer, said position being obtained by exertion of a predetermined air pressure against the cylinder in the direction of the retainer, effective to balance the force of the spring; a first extreme position in which the first series of openings is closed by the wall of the end wall bore and air flow is toward the end wall through the second series of openings and exhaust port, said first extreme position being obtained by exertion of back air pressure in the direction of the end wall, and a second extreme position in which the second series of openings is closed by the wall of the retainer bore, said last-named position being obtained on exertion of air pressure in the direction of the retainer to an extent sufficient to overbalance the opposing force of the spring.

3. A safety shut-off valve for air systems comprising: a valve body formed as a hollow cylinder to provide an air chamber therein, the body having one end formed open and having at its other end an end wall provided with a bore communicating with the chamber; a retainer formed as a plug separably attached to and closing the open end of the body and having a bore coaxial with the end wall bore; a reciprocable control cylinder extending through the chamber and having its opposite ends slidably mounted in the respective bores, the control cylinder having first and second recesses in its respective ends, a first series of openings communicating between the first recess and the chamber, a second series of openings communicating between the second recess and the chamber, and an exhaust port disposed between the respective series and communicating between the first recess and chamber; a guide collar formed on the control cylinder and apertured to permit flow of air therethrough, said guide collar slidably engaging the wall of the chamber at its periphery; and a spring surrounding the control cylinder and held under compression between the guide collar and retainer, said spring normally urging the control cylinder in the direction of the end wall, the control cylinder being arranged for adjustment to predetermined, flow-controlling positions within the body, namely, a middle position in which both series of openings are in communication with the chamber to permit air flow through both of said series and through the guide collar toward the retainer, said position being obtained by exertion of a predetermined air pressure against the control cylinder in the direction of the retainer, effective to balance the opposing force of the spring; a first extreme position in which the first series of openings is closed by the wall of the end wall bore and air flow is toward the end wall through the second series of openings and exhaust port, said first extreme position being obtained by exertion of back air pressure in the direction of the end wall, and a second extreme position in which the second series of openings is closed by the wall of the retainer bore, said last-named position being obtained on exertion of air pressure in the direction of the retainer to an extent sufficient to overbalance the opposing force of the spring.

4. A safety shut-off valve for air systems comprising: a valve body formed as a hollow cylinder to provide an air chamber therein, the body having one end formed open and provided with threads and having at its other end an end wall provided with a bore communicating with the chamber; a retainer formed as a plug threadedly attached to and closing the open end of the body and having a bore coaxial with the end wall bore; a reciprocable control cylinder extending through the chamber and having its opposite ends slidably mounted in the respective bores, the control cylinder having first and second recesses in its respective ends, a first series of openings communicating between the first recess and the chamber, a second series of openings communicating between the second recess and chamber, and an exhaust port disposed between the respective series and communicating between the first recess and chamber; a guide collar formed on the control cylinder and apertured to permit flow of air therethrough, said guide collar slidably engaging the wall of the chamber at its periphery; a sealing washer mounted on the control cylinder between said series of openings; and a spring surrounding the control cylinder and held under compression between the guide collar and retainer, said spring normally urging the control cylinder in the direction of the end wall, the control cylinder being arranged for adjustment to predetermined, flow-controlling positions within the body, namely, a middle position in which both series of openings are in communication with the chamber to permit air flow through both of said series and through the guide collar toward the retainer, said position being obtained by exertion of a predetermined air pressure against the control cylinder in the direction of the retainer, effective to balance the opposing force of the spring, a first extreme position in which the first series of openings is closed by the wall of the end wall bore and air flow is toward the end wall through the second series of openings and exhaust port, said first extreme position being obtained by exertion of back air pressure in the direction of the end wall, and a second extreme position in which the sealing washer is engaged against the retainer to prevent leakage between the control cylinder and retainer bore wall and in which the second series of openings is closed by the wall of the retainer bore, said last-named position being obtained on exertion of air pressure in the direction of the retainer to an extent sufficient to overbalance the opposing force of the spring.

DOMINIC BADAMI.

No references cited.